United States Patent [19]

Rau et al.

[11] 4,235,264

[45] Nov. 25, 1980

[54] APPARATUS AND METHOD FOR FACILITATING REMOVAL OF TRANSMISSION PANS

[76] Inventors: Kenneth R. Rau, 6930 Wadsworth Rd., Medina, Ohio 44256; John K. Rau, 295 E. 238th St., Euclid, Ohio 44123

[21] Appl. No.: 973,390

[22] Filed: Dec. 26, 1978

[51] Int. Cl.$^3$ .............................................. B65B 3/06
[52] U.S. Cl. ........................................ 141/1; 141/98; 141/231; 141/311 A; 184/106; 248/354 R; 269/15; 269/17
[58] Field of Search ............... 141/1, 291, 281, 311 A, 141/378, 392, 98, , 231; 184/1.5, 106; 248/354 R; 269/15, 17

[56] References Cited

U.S. PATENT DOCUMENTS

| 1,582,758 | 4/1926 | Jones | 184/1.5 |
| 3,667,573 | 6/1972 | Edwards | 184/1.5 |
| 3,967,697 | 7/1976 | Guenther | 184/1.5 |

Primary Examiner—Frederick R. Schmidt
Attorney, Agent, or Firm—Maky, Renner, Otto & Boisselle

[57] ABSTRACT

An apparatus and method for facilitating the removal of a transmission pan of the type having fasteners securing the pan to its housing are characterized by continuously mechanically retaining the pan in sealed engagement independently of the pan fasteners whereby the pan fasteners may be easily removed without spillage of fluid from the transmission, and then allowing the pan to be retracted into a fluid catch basin located beneath the transmission and substantially surrounding the pan and a portion of the housing whereby spillage and leakage of the fluid without the catch basin is prevented.

25 Claims, 12 Drawing Figures

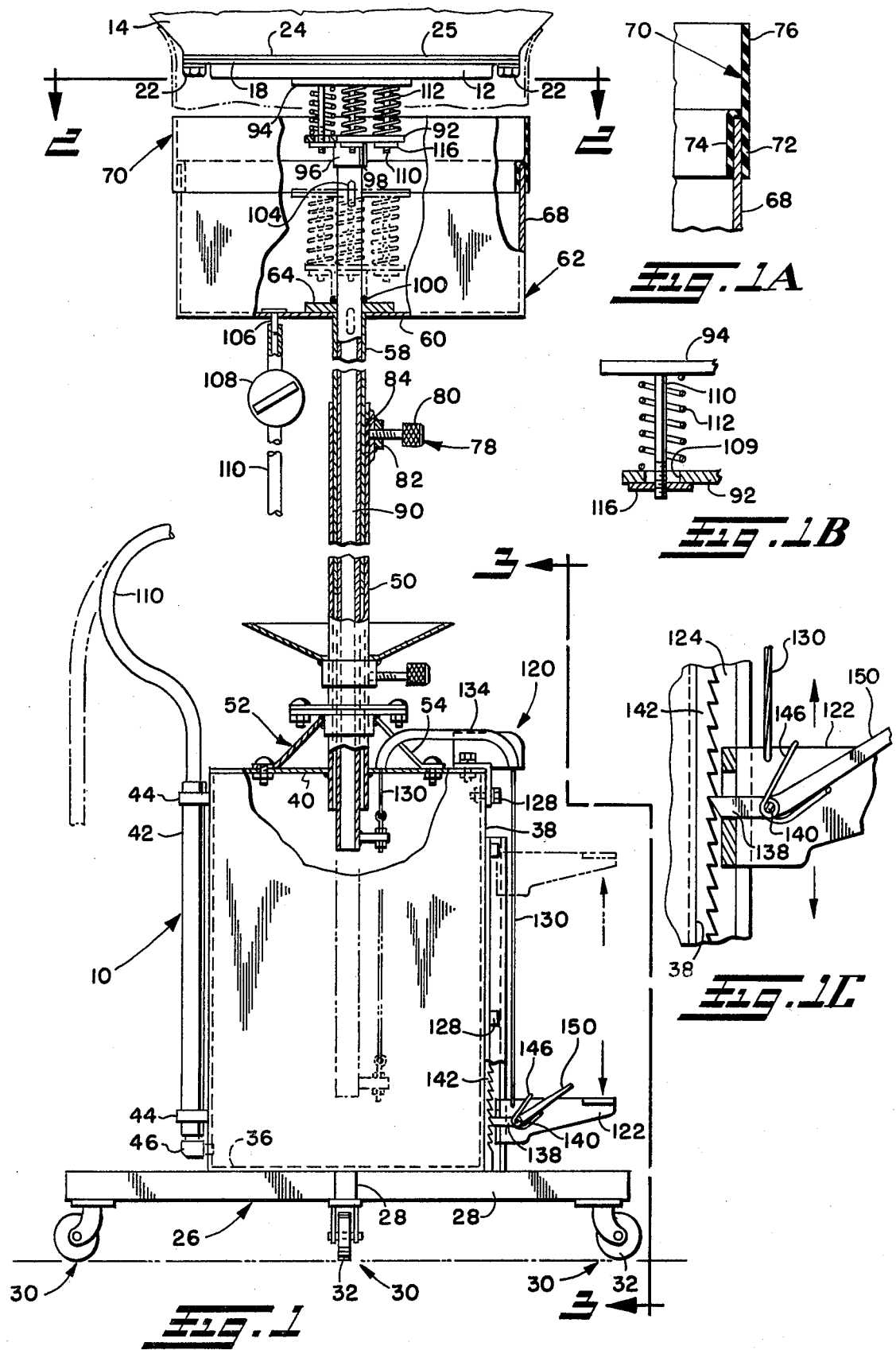

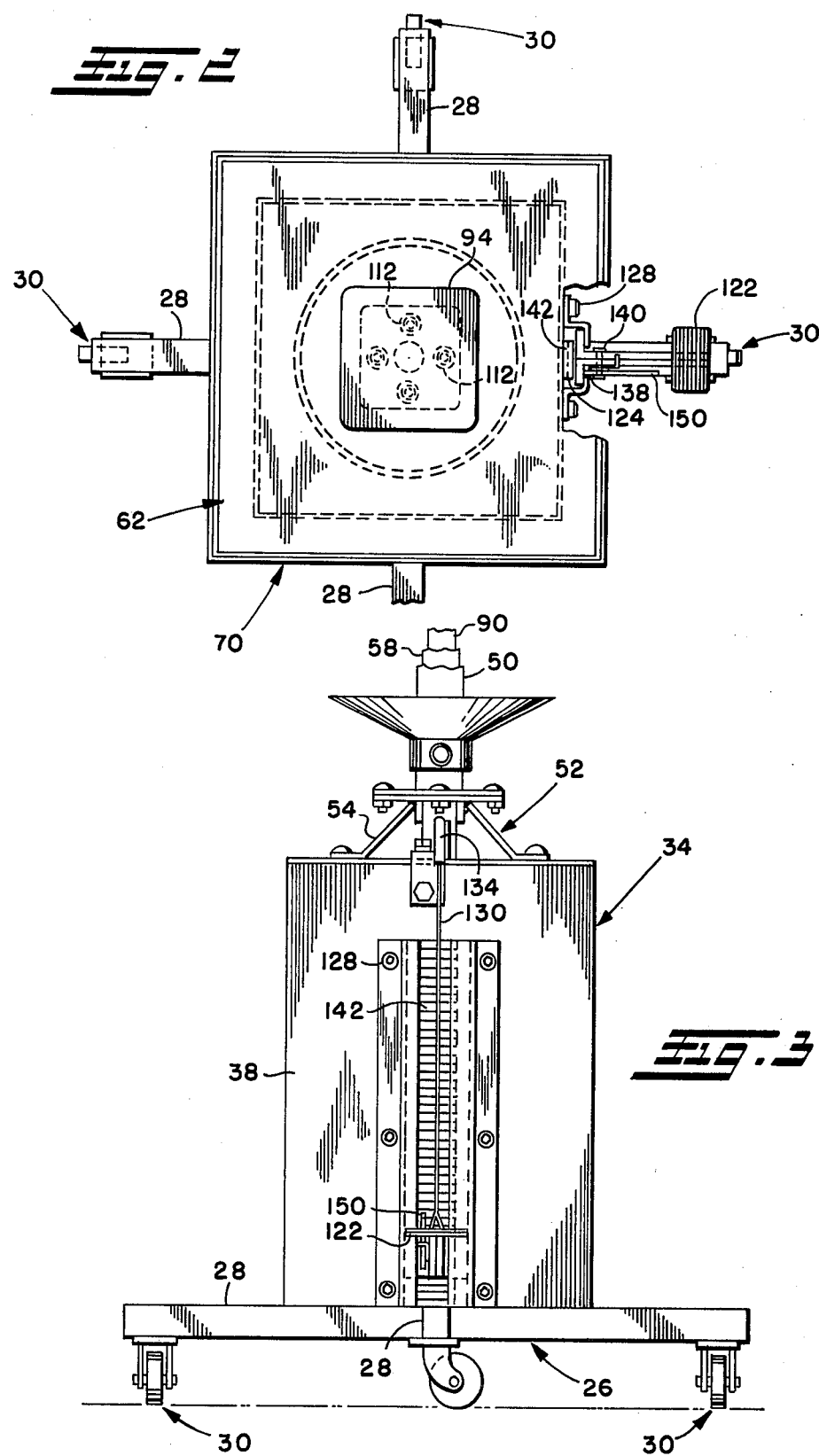

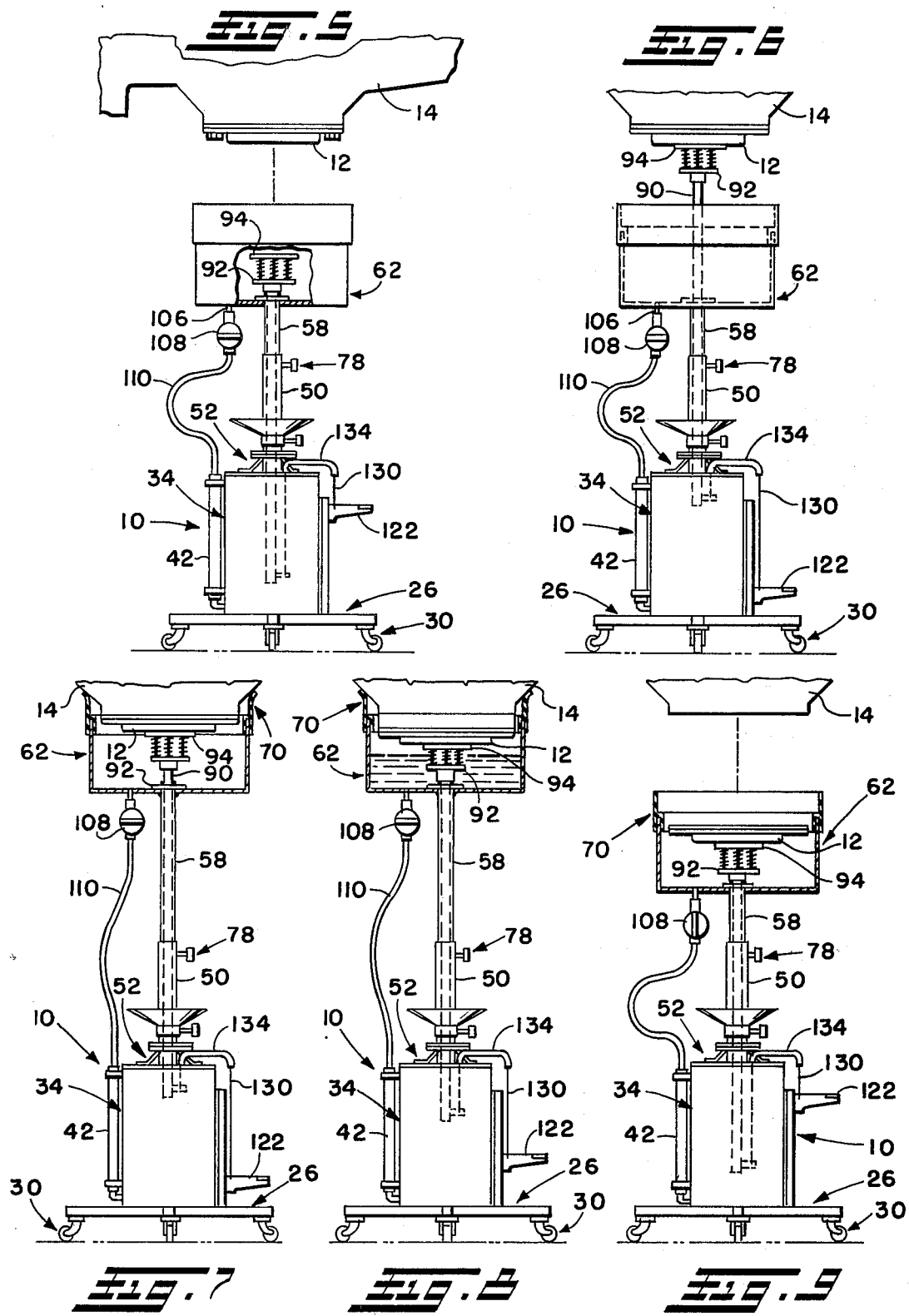

APPARATUS AND METHOD FOR FACILITATING REMOVAL OF TRANSMISSION PANS

FIELD OF THE INVENTION

This invention relates generally to automobile mechanic tools and a method of using the same, and more particularly to an apparatus and method for facilitating the removal of transmission pans or the like from their housings. The apparatus and method facilitate the removal of a transmission pan from a transmission housing by a single automobile service mechanic with minimal spillage of the transmission fluid retained by the pan in the housing.

BACKGROUND OF THE INVENTION

In a vehicle transmission such as found in conventional automobiles, normal maintenance and service requires removal of the transmission pan which is usually fastened at its peripheral mounting flange by a plurality of bolts to the bottom of the transmission housing. For example, the pan must be removed to repair or to inspect the transmission or simply to change the transmission fluid contained within the transmission as is commonly periodically done for preventive maintenance purposes. Unfortunately, most automatic transmissions today are not provided with drain plugs for removal of the fluid retained within the transmission by the pan so that the transmission cannot be emptied of fluid without removing the pan. Removal of the pan by a service mechanic has always been messy, time consuming and difficult, and harmful when the fluid is hot, particularly because the quantity of fluid is greater than the capacity of the transmission pan and separation of the pan from the transmission housing results immediately in the fluid flowing through the gap formed between the pan and housing by such separation. This has been a long standing problem confronting service mechanics.

It is well known to persons acquainted with automobile maintenance that the generally accepted method of removing a transmission pan is to place a large tub or basin on the floor or on a pedestal beneath the transmission and then to loosen the bolts with a suitable tool so that the pan will tip slightly at one corner hopefully to drain thereat the fluid from the pan more or less in a stream. However, upon loosening of the pan bolts and separation of the pan from the housing, the fluid oftentimes before such tipping can be accomplished will leak through the gap formed between the pan and housing and/or through the bolt holes in the pan mounting flange causing fluid, which may be hot, to run down the arms of the mechanic and/or to squirt beyond the peripheral extent of the tub onto the floor. Moreover, if the tub is mispositioned, considerable fluid may be drained onto the floor before the service mechanic can remedy the problem.

Only after the transmission housing has drained but for the fluid contained within the pan, which may take several minutes, the bolts are then completely removed preferably while an assistant holds the pan to prevent the same from falling into the basin and to prevent the fluid therein from spilling. As the pan often is slippery and because the assistant normally must reach over the basin to hold and remove the pan, it is not unknown for the pan to slip from the assistant's hands and either drop into the basin causing the fluid therein to splash or drop to the floor causing the fluid contained in the pan to spill onto the floor.

Thus, it can be seen that such known method is not only messy and difficult, but is time consuming requiring the bolts to be loosened in a special sequence for draining and then later removed only after considerable delay for allowing the transmission fluid to drain from the transmission. Moreover, such method preferably requires two persons, one to remove the bolts while the other holds the pan to prevent the same from dropping. Also, the mechanic may be burned when the hot fluid contacts his skin.

OBJECTS OF THE INVENTION

It is a principal object of the present invention to provide a method and apparatus for facilitating the removal of transmission pans or the like from transmission housings.

Another object of the invention is to provide such a method and apparatus which will permit the task of removal of the pans by a service mechanic to be done cleanly and with no or minimal spillage of fluid.

Still another object of the invention is to provide such an appratus which is simple in construction, inexpensive to manufacture, rugged in construction, easy to use and efficient in use.

Yet another object of the invention is to provide such an apparatus with which a single mechanic can rapidly and easily remove the transmission pan from its housing in little time and with little difficulty and mess.

A further object of the invention is to provide such an apparatus having provision for storage of waste fluid and/or for saving of the fluid for subsequent reuse.

Still a further object of the invention is to provide such an apparatus which permits the mechanic to remove the pan from the housing and which catches all the transmission fluid so that the mechanic does not come into physical contact with the same.

Yet a further object of the invention is to provide such an apparatus and method so that a mechanic never comes into contact with the transmission fluid which may be hot during removal of the transmission pan.

SUMMARY OF THE INVENTION

The method and apparatus of the present invention provides for easy and rapid removal of a transmission pan or the like from its housing with no or minimal mess caused by spillage and/or leakage of the fluid contained by such pan in the transmission.

The method of the invention contemplates retaining the transmission pan in sealed engagement with the housing independently of the fasteners normally provided to secure the pan to the housing. When so retained, the fasteners may be easily and quickly removed without spillage of fluid. After the fasteners are removed and while the pan is still retained solely independently thereof, a fluid catch basin is located beneath the transmission preferably substantially surrounding the pan and partially coextensive with the transmission housing. The pan is then lowered towards the catch basin causing the fluid to empty into the catch basin where it may be retained or alternatively directed to a waste reservoir for such fluid or to a container for saving the fluid for reuse.

The apparatus according to the invention for carrying out such method comprises a pan retention member in one position operable for retaining the pan in sealed engagement with the housing independently of the pan fasteners and in another position for permitting retraction and removal of the pan away from the housing. A catch basin is operatively associated with the pan retention member for receiving the fluid as the pan retention member moves from one position to such other position thus releasing and lowering the pan.

According to the preferred embodiment, the catch basin is movable from a first or retracted position to a second or operative position when the pan retention member is in such one position for retaining the pan. When in such retracted position, adequate clearance is provided of the pan fasteners thereby to allow quick removal of the same. After removal of the fasteners, the catch basin is movable to such operating position surrounding the pan and lower portion of the housing to catch the fluid as the pan retention means is moved to such another position for permitting removal and lowering of the pan from the housing.

Still according to the preferred embodiment, an actuator assembly is provided for moving the pan retention member between such one and other position by remote actuation of the actuator assembly externally of the catch basin. The actuator assembly includes a ratchet assembly for maintaining the pan retention member in such one position and a biasing element interconnects the actuator assembly and pan retention member for urging the pan retention member against the pan with sufficient force to maintain the pan in sealed engagement with the housing. Moreover, self-centering of the pan retention member is provided to ensure positive engagement with the pan.

Another feature of the present invention is the provision of a flexible apron about the periphery of the basin and extending upwardly therefrom which, when the catch basin is in its operating position, circumscribes the transmission housing in substantially sealed engagement therewith to prevent fluid from splashing out of the basin when the pan is removed from the housing. Moreover, such flexible apron allows for the insertion of a suitable tool to pry the pan from the housing in the event the former is stuck to the latter after the pan retention member has moved to such another position. The skirt is moldable about the transmission housing.

Still another feature of the invention is the provision of a reservoir for waste fluid which is either directly or indirectly in fluid communication with the catch basin, or alternatively, the fluid may be drained from the catch basin into a salvage container in the event the fluid is to be reused.

Other features, objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a side elevation view, partially broken away and partially in section, illustrating in solid lines the apparatus according to the invention with the pan retention member elevated and catch basin retracted, and in phantom lines the pan retention member retracted and catch basin elevated;

FIGS. 1A, 1B and 1C are enlarged fragmentary views of portions of the apparatus of FIG. 1;

FIG. 2 is a top plan view, partially broken away, of the apparatus of FIG. 1;

FIG. 3 is a partial side elevation view of the apparatus of FIG. 1;

FIGS. 5-9 are side elevation views of the apparatus of FIG. 1 illustrating the method of the invention, and more particularly:

FIG. 5 shows the apparatus positioned beneath the transmission and fully retracted prior to actuation of the same;

FIG. 6 shows the pan being retained by the elevated pan retention member of the apparatus and the pan fastening bolts removed;

FIG. 7 shows the fluid catch basin in its elevated position and the pan being retained by the still elevated pan retention member;

FIG. 8 shows the pan retention member and pan lowered into the catch basin with the transmission fluid received in the catch basin; and FIG. 9 shows the apparatus fully retracted with the pan lowered in the catch basin.

DESCRIPTION OF THE PREFERRED EMBODIMENT

Figure 4:
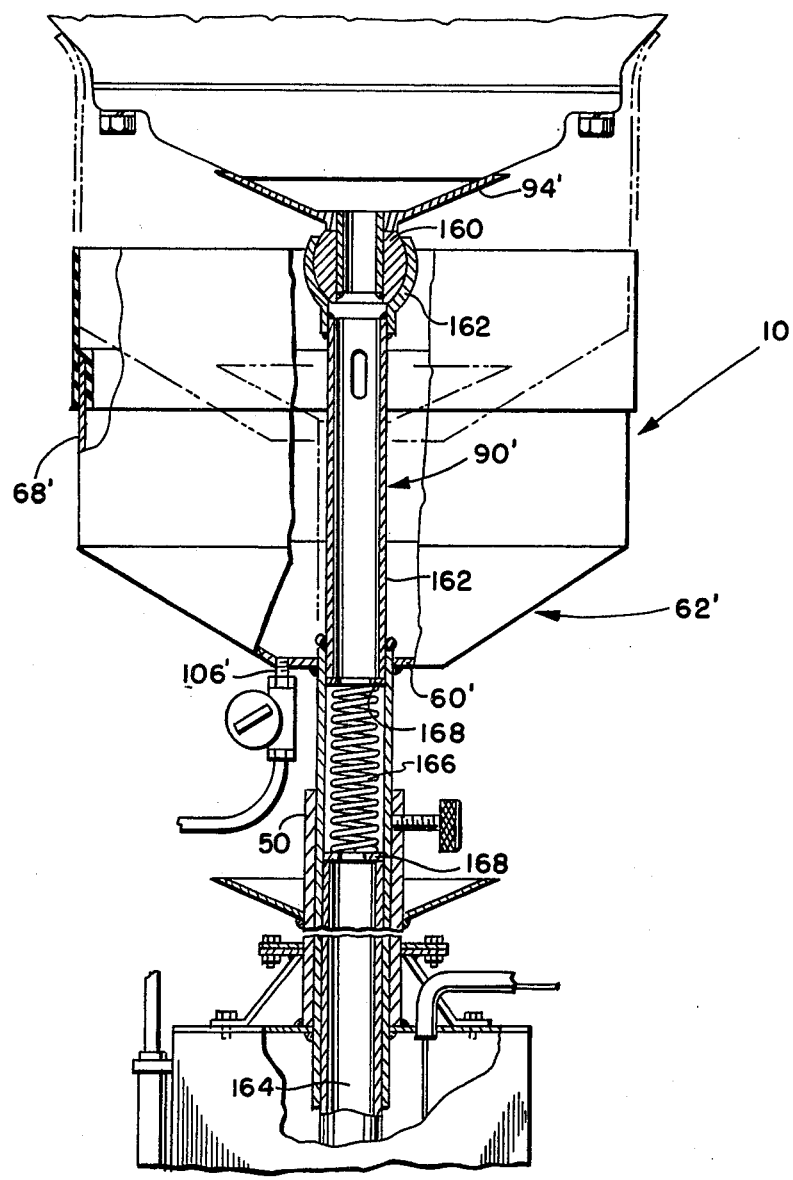
FIG. 4 is a partial side elevation view, partially broken away and partially in section, of a modified apparatus according to the invention.

Referring now in greater detail to the drawings and initally to FIG. 1 thereof, an apparatus according to the invention is designated generally by reference numeral 10 and is intended to facilitate the removal of a transmission pan 12 from a transmission housing 14 of a vehicle which preferably has been elevated on a lift or the like to allow for positioning of the apparatus 10 beneath the same as shown. Transmission pan 12, as are most conventional transmission pans used on automobiles, is generally rectangular in shape and has a peripheral mounting flange 18 extending outwardly laterally from the top thereof. Such mounting flange 18 is provided with a plurality of holes through which fasteners such as bolts 22 extend. The bolts 22 are threadedly received in corresponding threaded bores in the mounting face 24 of the housing for securing of the pan thereto with the pan spanning the lower opening in the housing. To prevent leakage of transmission fluid normally contained within the transmission, a gasket 25 often is provided intermediate the pan 12 and housing 14 to ensure an adequate seal between the same. Accordingly, access to the interior of the transmission housing may be had through the lower opening in the housing by removal of the pan.

As seen in FIGS. 1-3, the apparatus 10 comprises a base 26 which has mounted thereon for independent vertical movement a catch basin 62 and pan retention member 94 which will be discussed more fully below. By independent actuation of the catch basin and pan retention member in the below described manner, the pan 12 may be easily and quickly removed from the housing 14 with no or minimal spillage.

The base 26 includes a pair of horizontal frame members 28 that are crossed intermediate their lengths. Secured to and supporting the respective ends of the frame members are caster assemblies 30 having caster wheels 32 which provide a four-point support for the apparatus while providing for movement of the apparatus by rolling of the same on the caster wheels between a storage position normally adjacent the lift in a service garage to a service position shown in FIG. 1.

Mounted on the base frame members 28 for movement therewith is a waste fluid reservoir or tank 34 which may be box-shape as shown having bottom wall 36, side walls 38 and top wall 40. The bottom wall 36 preferably is centrally disposed relative to the crossed base frame members and is secured thereto such as by welding or by suitable fasteners. As best seen in FIG. 2, it will be appreciated that the respective ends of the base frame members may project outwardly beyond the sidewalls 38 of the waste tank to ensure vertical stability of the apparatus. If desired, a sight gauge or tube 42 may be mounted vertically on one of the side walls of the waste tank by brackets 44 with the lower end of the sight tube communicating with the interior of the tank through elbow fitting 46. Thus, the level of fluid in the tank can be readily ascertained by viewing the sight tube. Of course, the tank may be provided with a suitable drain for emptying the same when full.

The top wall 40 of the tank 34 is provided preferably centrally thereof with a circular opening and has secured thereat a hollow tubular upright or outer tubular element 50 which is concentric with such opening and projects upwardly from the top wall. To rigidify the tubular upright, a spider bracket 52 may be provided having outwardly and downwardly extending radial arms 54 secured to the top wall radially outwardly from the tubular upright by suitable fasteners.

The tubular upright 50 receives and supports in telescopic fashion an intermediate tubular element 58 which depends from and supports the base wall 60 of a fluid catch basin 62 which is shown in solid lines in FIG. 1 in a retracted or lowered position and in phantom lines in an elevated operative position proximate the transmission housing 14. To facilitate securing the intermediate tubular element to the base wall 60, a mounting plate 64 may be provided to which the intermediate tubular element is secured and which is in turn secured to the base wall 60.

The catch basin 62 has side walls 68 extending vertically upwardly from the base wall 60 defining a rectangular opening at the top thereof which preferably is of a size sufficient to accommodate most sizes of transmission pans, such opening being larger than such pans to enable the catch basin to surround the pans and lower portion of the transmission housings when moved vertically upwardly to its operative position. The side walls 68 at their upper portions are substantially vertical and may have mounted thereat a flexible skirt or gasket 70 comprised of rubber or similar resilient material which extends around the periphery of the catch basin opening. As best seen in FIG. 1A, such flexible skirt 70 may have a lower downwardly opening U-shape portion formed of two spaced-apart parallel legs 72 and 74 with the spacing therebetween being such to receive the side walls 68 in the bight thereof with a snug fit thus to hold the skirt in place on the catch basin. The upper portion 76 of the skirt projects upwardly beyond the top of the side walls.

When the catch basin is in its raised position surrounding the transmission pan as seen in phantom lines in FIG. 1, the flexible skirt will surround and conform to the contour of the lower portion of the transmission housing to effect a seal therewith to preclude fluid from escaping through the gap between the catch basin and housing when the pan is removed from the housing.

To effect upward vertical movement of the catch basin 62 from its retracted position, the same may be lifted manually causing the intermediate tubular member 58 to extend telescopically from the tubular upright 50. The catch basin may be elevated to an operative position such that the flexible skirt 70 surrounds the transmission pan 12 and is in sealed engagement with the transmission housing 14 as described above. To maintain the catch basin in such operative position, a catch basin lock assembly 78 comprises a thumb screw 80 which is threadedly received in a threaded bore of a stud 82 secured to the tubular upright 50. The stud spans an opening in the tubular upright in which is disposed a friction pad 84 secured to the end of the thumb screw. Rotation of the thumbscrew in one direction will cause the friction pad to bear against the intermediate tubular element to bind and lock the same against movement. Rotation of the thumb screw in the other direction will of course unlock the intermediate tubular element. To enable locking of the intermediate tubular element over maximum extension of the same from the tubular upright, the lock assembly 78 is preferably located at the upper end of the tubular upright.

Still referring to FIGS. 1-3, it can be seen that an inner tubular element 90 is telescopically received and supported for vertical movement in the intermediate tubular element 58 and projects upwardly therefrom into the confines of the catch basin 62 and has secured at its top end a flange plate 92 to which in turn is mounted a pan engagement or pan retention member such as pressure plate 94.

The bottom of the flange plate 92 is in the form of a collar 96 which receives the end of the inner tubular element 90 and defines a shoulder 98 which when in a retracted or lowered position shown in phantom lines in FIG. 1 may rest on the base wall 60 of the catch basin 62 and/or top of the intermediate tubular member 58 such as on the mounting plate 64. A seal such as O-ring 100 is provided at the top surface of the mounting plate 64 and surrounds in wiping engagement the inner tubular element 90 to prevent fluid contained in the catch basin from draining through the gap between the same and the inner tubular element. To provide for draining of fluid from the catch basin when desired, the inner tubular element 90 is provided with a vertical slot 104 which, when the shoulder 98 of the collar 96 rests against and sealingly engages the O-ring seal 100, has its upper end slightly below such seal. When the pan engagement member is elevated slightly, the slot will be above the seal communicating with the interior of the catch basin to effect draining of the basin through the inner tubular elements 90 into the waste fluid tank 34. The slot preferably is short, such as about 1 inch, so that when the inner tubular element is substantially extended, the lower end of the slot will be above the level of the fluid retained in the catch basin.

Alternate and/or additional means may be provided for draining the catch basin. For example, a fitting 106 may be received in an opening in the base wall 60 of the catch basin 62 and serves as a drain therefor. The fitting 106 is coupled at its outer end to a valve 108 which in turn is coupled to the end of a flexible hose or tube 110. The other or free end of the flexible hose may be received in the open end of a sight tube 42 mounted on the side wall of the waste fluid tank 34. Alternatively, the free end of the flexible hose may be inserted in a container (not shown) for draining in the event the fluid is to be reused.

As best seen in FIGS. 1, 1B and 2, the flange plate 92 further has a plurality of vertical bores or openings 109 which receive for vertical movement therethrough guide rods 110 which depend verticaly downwardly from the pressure plate 94. The pressure plate 94 is biased upwardly by springs 112 encircling the guide rods 110 intermediately the pressure plate and flange plate. To ensure that the springs do not urge the pressure plate upwardly such that the guide rods no longer extend through the bores, the guide rods pass through and beneath the flange plate 92 and have threaded ends on which are threaded bolts 116 which are sized larger than the openings in the flange plate. Preferably, there are four such rods and openings symetrically arranged relative to the axis of the inner tubular element 90 and the openings 109 are sized sufficiently to allow the guide rods 110 to tilt at an angle to vertical whereby the pressure plate may assume an angular relationship relative to the flange plate for self-centering purposes.

With the foregoing construction, when the inner tubular element 90 is raised in the below described manner, the pressure plate 94 may be brought into engagement with the transmission pan 12, and if the inner tubular element is raised further, the pressure plate will be biased or urged upwardly with sufficient force to hold the pan in sealed engagement with the housing 14 while enabling the inner tubular element to be locked in a number of discrete positions as discussed below. In addition, the pressure plate is self-centering in the event the transmission pan is not parallel to the pressure plate in its unbiased position thus to provide positive engagement of the pressure plate with the pan.

Still referring to FIGS. 1-3, the inner tubular element 90 and thus the pressure plate 94 can be seen to be movable vertically by means of an actuator assembly designated generally by reference numeral 120. The actuator assembly 120 comprises a foot pedal 122 which is constrained for vertical movement in a track 124 secured to a side wall 38 of the fluid waste tank 34 by fasteners 128. An actuator cable 130 is connected at one end to the foot pedal 122, is reeved through arcuate guide 134 mounted at the top of waste tank 34, and is connected at its other end to the lower end of the inner tubular element 90 such that the foot pedal is in a raised position when the inner tubular element is in a lowered position, and vice versa. When the foot pedal is in a raised position, application of force downwardly on the foot pedal 122 will effect upward vertical movement of the inner tubular element and thus the pressure plate as will become more apparent below.

To lock the inner tubular element at a desired elevation, a pawl 138 secured to the foot pedal 122 at pivot 140 cooperates with an elongate ratchet plate 142 secured to the side wall 38 of the waste tank 34 within the track 124. A spring element 146 urges the pawl 138 to rotate counterclockwise as seen in FIG. 1 to urge the pawl into positive engagement with the ratchet teeth as the pedal 122 is lowered. The pawl is adapted to engage the ratchet teeth to lock the lever and thus the inner tubular element 90 at any number of discrete positions. The pawl preferably is provided with a relatively long release arm 150 which may be depressed to clear the pawl from the ratchet teeth and thus allow the pedal to be raised.

It of course will be appreciated that by depressing the foot pedal 122, the inner tubular element 90 will be urged upwardly by the cable 130 such that the pressure plate 94 will engage the lower surface of the transmission pan 12. After the pressure plate 94 first engages the pan, the pedal preferably is depressed slightly further thus to urge the flange plate 92 further upwardly to bias the pressure plate against the pan with sufficient force to maintain the pan in sealed engagement with its housing 14. When in such position, the mechanic's foot may be removed from the foot pedal and the pawl 138 will engage the ratchet thus to lock the apparatus in such actuated position. To release the pressure plate, the pawl release arm 150 is depressed such that the pawl clears the teeth of the ratchet plate 142 allowing the pedal to be raised thus lowering the pressure plate. It will be appreciated that the weight of the pressure plate, flange plate and inner tubular element should be sufficient to effect such lowering without upward force having to be applied to the pedal by the mechanic.

Turning now to FIG. 4, wherein primed reference numerals designate parts generally corresponding to those of like numerals identified above, a modified apparatus 10' includes a modified catch basin 62' having a funnel-shape construction. The side walls 68' at their lower portions are bent inwardly towards the base wall 60' giving the catch basin the funnel shape which facilitates draining of fluid contained therein into the fitting 106'.

The pressure plate 94' of the modified apparatus 10' is of inverted truncated cone shape and has secured at the bottom thereof a swivel ball 160 which is received in a spherical socket 162 mounted at the top of the inner tubular element 90'. The ball and socket arrangement provides for self-centering of the pressure plate 94' in the event the transmission pan is not parallel with the floor on which the modified apparatus 10' stands, the constuction of such apparatus 10' being the same as that of FIGS. 1-3 unless otherwise noted.

The pressure plate 94' is vertically movable as above described, however, the inner tubular element 90' comprises upper and lower segments 162 and 164, respectively, which are interconnected by a resilient member such as coil spring 166. To prevent the spring 166 from entering the hollow of the segments 162 and 164 of the inner tubular element, washers 168 may be employed at the ends thereof. The center openings of the washers provide for passage of fluid therethrough for emptying of the catch basin. With the lower segment 164 interconnected with the lever in the manner described in connection with FIGS. 1-3, the pressure plate 94' may be urged against the transmission pan and biased thereagainst by the coil spring 166.

OPERATION

Turning now to FIGS. 5-9, the operation of the apparatus 10 in accordance with the method of the present invention can be seen. With the pressure plate 94 and catch basin 62 positioned in a retracted position, the apparatus may be positioned beneath the transmission pan 12 and housing 14 of a vehicle as seen in FIG. 5. The service mechanic may then depress the foot pedal 122 to raise the pressure plate 94 into engagement with the transmission pan 12 and to bias the same upwardly against the housing 14 with sufficient force to maintain the pan in sealed engagement with the housing even when the transmission pan bolts 22 are removed. When the mechanic removes his foot from the pedal, the pawl 138 will engage a corresponding ratchet tooth of the ratchet plate 142 to lock the pressure plate in such biased position. After the pressure plate is in such biased position and with the catch basin 62 being in a retracted position, sufficient access is provided to the pan bolts 22 whereby the same may be easily and quickly removed as seen in FIG. 6.

After removal of the pan bolts 22, the catch basin 62 is then raised by the mechanic so that it now surrounds the transmission pan with the flexible skirt 76 forming a seal with the transmission housing 14 as seen in FIG. 7. The catch basin is then locked in such position by the catch basin lock assembly 78. With the catch basin in such raised or operative position, the mechanic may now depress the pawl release arm 150 of the pawl 138 so that the pan 12 is lowered by the pressure plate 94 into the catch basin allowing the transmission fluid to drain from the housing into the catch basin as seen in FIG. 8. In the event the pan tends to stick to the housing, the flexible skirt 76 allows for insertion of a tool such as a screwdriver whereby the pan may be pried from the housing. With the pan now resting on the pressure plate in a retracted position, the basin lock assembly is released and the pawl release arm 150 depressed to lower the pan and catch basin preferably together to the position seen in FIG. 9.

When in such lowered position of FIG. 9 or in the raised position of FIG. 8, the fluid in the catch basin 62 may be drained into the waste tank 34 by slightly depressing the foot pedal 122 to raise slightly the flange plate 92 to allow the fluid to drain through the inner tubular element 90 via the slot 104 therein. Alternatively, the valve 108 may be opened as shown in FIG. 9 to drain the catch basin via the flexible hose 110 into the waste tank 34.

Although the apparatus is used primarily to facilitate removal of the pan, the apparatus may also be utilized to facilitate mounting of the pan 12 on the housing 14. With the pan 12 placed on the pressure plate 94, the foot pedal 129 may be depressed to urge the same upwardly against the housing. Only slight force should be utilized to enable the pan to be centered properly with the housing for alignment of the bores in the pan mounting flange with corresponding threaded bores in the housing. When properly centered, the bolts may be secured in their respective bores in the transmission housing and then tightened. Of course, the catch basin is preferably maintained in a lowered position during mounting of the pan.

The foregoing description is illustrative of the preferred practical embodiments of the present invention. While various changes may be made in the detail construction, it is understood that such changes will be within the spirit and scope of the present invention as is defined by the appended claims.

The embodiments of the invention in which an exclusive property or privilege is claimed are defined as follows:

1. An apparatus for facilitating with no or minimal spillage of fluid the removal of a transmission pan from a transmission housing of the type having at least one fastener securing the pan to the housing, comprising:
  pan retention means in one position operable for retaining such pan in sealed engagement with such housing independently of such fastener and in another position for permitting disengagement of such pan from such housing, and
  catch basin means operatively associated with said pan retention means for receiving such fluid as said pan retention means moves from said one position to said another position,
  said catch basin means being movable while said pan retention means is in said one position from a remote position permitting access to the fastener for removal of the same to an operative position surrounding such pan, and said pan retention means including a pan engagement member and actuating means for moving said pan engagement member between said one and another position when said catch basin means is in said operative position.

2. The apparatus of claim 1 wherein said actuator means is operated from a location externally of said catch basin.

3. The apparatus of claim 1 wherein said actuating means comprises means for locking said pan engagement member in said one position.

4. The apparatus of claim 3 wherein said means for locking comprises a ratchet and pawl.

5. The apparatus of claim 3 comprising biasing means for urging said pan engagement member when in said one position against the pan with sufficient force to ensure sealing engagement between the pan and housing after the fastener is removed.

6. The apparatus of claim 5 comprising a base, and wherein said actuating means comprises a first vertically movable member mounted on said base and means to move said vertically movable member, and said biasing means comprises spring means interconnecting said pan engagement member and vertically movable member.

7. The apparatus of claim 6 wherein said first vertically movable member comprises a flange plate having at least one opening therein, said pan engagement member has a guide rod depending therefrom through said opening, and said spring means comprises a spring intermediate said flange plate and pan engagement member for resiliently urging said pan engagement member away from said flange plate.

8. The apparatus of claim 6 comprising a second vertically movable member mounted on said base, said spring means interconnecting said first and second vertically movable members, and a ball and socket assembly interconnecting said second vertically movable member and pan engagement member.

9. The apparatus of claim 1 comprising a base and said actuating means comprises a foot pedal mounted for vertical movement on said base and cable means interconnecting said foot pedal and pan engagement member.

10. The apparatus of claim 1 comprising a reservoir and means interconnecting said reservoir and said catch basin means.

11. An apparatus for facilitating the removal of a transmission pan from its housing comprising:
  a support member,
  a fluid catch basin,
  a pan engagement member,
  means for mounting said catch basin and said pan engagement member on said support member for relative selective vertical movement, and
  actuator means for moving said pan engagement member vertically on said support member and for holding said pan engagement member in an elevated position whereby said pan engagement member can be moved into engagement with the transmission pan and can hold same in place against the housing during unfastening of the pan from the housing, and then lowered to permit removal of the pan from the housing, said fluid catch basin being located beneath said pan engagement member and of a size to receive fluid from the housing as the pan is removed therefrom.

12. The apparatus of claim 11 wherein said means for mounting includes inner, intermediate and outer telescoping tubular elements, said outer tubular element mounted on said support member, said intermediate tubular element supporting said catch basin and said inner tubular element supporting said pan engagement member.

13. The apparatus of claim 12 comprising a tank mounted on said support member and means for fluidically interconnecting said catch basin and said tank.

14. The apparatus of claim 13 wherein said means for fluidically interconnecting is said inner tubular element.

15. The apparatus of claim 14 comprising additional means for fluidically interconnecting said catch basin and said tank, said last mentioned means comprising a valve connected to said catch basin and a flexible hose connected to said valve.

16. The apparatus of claim 15 wherein said outer tubular element is mounted on the top of said tank and extends vertically upwardly therefrom.

17. The apparatus of claim 16 wherein said tank has a side wall with an opening therein, and said actuating means comprises a foot pedal mounted for vertical movement on said side wall and a reeved cable connected at one end to said foot pedal and at its other end to the lower end of said inner tubular element.

18. The apparatus of claim 12 comprising means for locking said intermediate tubular element against movement relative to said outer tubular element.

19. The apparatus of claim 11 comprising a flexible skirt extending upwardly from the top of said fluid catch basin.

20. The apparatus of claim 19 wherein said flexible skirt has a lower downwardly opening U-shape portion for receiving the top of said fluid catch basin in the bight thereof with a snug fit to hold said flexible skirt in place on said fluid catch basin.

21. The apparatus of claim 11 wherein said fluid catch basin is movable from a lowered position to a raised position for surrounding the transmission pan.

22. The apparatus of claim 21 wherein said actuator means includes means for lowering said pan engagement member when said basin is in said raised position.

23. A method of removing with minimal spillage of fluid a transmission pan from a transmission housing of the type having at least one fastener securing the pan to the housing, comprising the steps of:

retaining the pan in sealed engagement with the transmission housing independently of the fastener, wherein said step of retaining comprises bringing a pan engagement member into contact by means of an actuation asembly with sufficient force to retain the pan in sealed engagement with the housing and locking the same, unfastening the pan from the housing by removing the fastener while continuously maintaining the pan in sealed engagement with the transmission housing, locating a catch basin beneath the transmission pan, and retracting the pan towards the basin causing the fluid to empty into the basin.

24. The method of claim 23 wherein said step of locating comprises elevating the catch basin so that it surrounds the pan when the pan is retained by the pan engagement member.

25. The method of claim 24 wherein said step of retracting comprises lowering the pan engagement member into the basin when the basin surrounds the pan.

* * * * *